2,763,639
PROTEIN DERIVATIVES AND THEIR PREPARATION

Herbert S. Elins, Donald C. Bellis and John W. Gates, Jr., Rochester, N. Y., assignors to Eastman Kodak Company, Rochester, N. Y., a corporation of New Jersey No Drawing. Application September 26, 1952, Serial No. 311,781

5 Claims. (Cl. 260—117)

This invention relates to derivatives of gelatin and other proteins by reacting the protein with an organic ester at an alkaline pH.

Proteins in general and gelatin in particular have been known for several decades and have been found to have many and varied applications making use of solubility characteristics, the presence of an iso-electric point or water swelling characteristics. Gelatins in particular vary as to their degree to which they are susceptible to the action of water which depends upon other things on the purity of the gelatin, the method by which prepared and the chemical make-up. It has sometimes been found that the characteristics of gelatin or other proteins may be altered by treatment thereof, some of which treatments are chemical in nature.

One object of our invention is to prepare organic ester derivatives of proteins. Another object of our invention is to prepare protein compounds having different characteristics than either of the compounds employed in their preparation. A further object of our invention is to prepare compounds from proteins having different iso-electric points than those of the original proteins. Other objects of our invention will appear herein.

We have found that the reaction products of protein and particularly gelatin with organic esters of the type referred to herein exhibit unique characteristics as regards viscosities, swelling characteristics in the flocculation of silver halide therein, water solubilities and iso-electric points.

Our invention relates to the reaction of proteins such as gelatin, casein, soy bean protein or blood albumin with certain organic esters as pointed out herein. The reaction is carried out under alkaline conditions such as at pH of 8–12, preferably 9–11, and in an aqueous dispersion such as water-acetone water-formamide, water-dioxane, water alone or other appropriate aqueous solvent mixtures, accompanied by moderate heating such as within a temperature of 30–70° C. We have found that by treating proteins with esters of the type specified herein protein derivatives can be prepared which differ from the original protein material not only in a changed iso-electric point but also in various other physical and chemical properties.

We have found that proteins in general and gelatin in particular is reactive with certain esters the ester linkage of which is activated. The type of esters which we have found will successfully react with proteins or gelatin by virute of an activated ester linkage are as follows:

1. Phenyl esters in which are found electro negative groups, ortho or para to the phenolic oxygen therein. It is the esters thereof with aliphatic or aromatic acids which have been found to be suitable. For instance, the ester may be a formate, acetate, benzoate or a benzene sulfonate, the phenyl radical of the compound prepared being nitro-phenyl, chloro-phenyl or the like. Esters under this designation useful in our invention are p-nitrophenyl acetate, o-nitrophenyl acetate, p-nitrophenyl benzoate and the like.

2. Alkyl, aryl or aralkyl esters of these aromatic acids in which an electro negative group is present in the acid radical, ortho or para to the carboxyl. Some of the esters of this type which will be suitable are ethyl chlorobenzoate, ethyl nitrobenzoate, alkyl-hydroxynapthoate and phenyl salicylate.

3. Carboxylic acid esters of unsaturated alcohols. Some of the compounds of this nature which have been indicated as suitable for use are isopropenyl acetate, vinyl acetate, crotonyl acetate and styryl acetate.

In the carrying out of the preparation of protein derivatives in accordance with our invention, an aqueous dispersion of gelatin or other protein is heated with a solution of one of the esters mentioned or its equivalent at an elevated pH and temperature. If desired non-aqueous solvents such as formamide may be employed as the solvent for the gelatin. The reaction proceeds most satisfactorily at a pH of 9–11. It is desirable to operate the process at an elevated temperature such as 30–70° C. In the course of the reaction the pH of the reacting mass may change so it may be desirable to add alkali from time to time to maintain the pH of the mass approximately uniform. After the reaction has been completed, which sometimes may be as long as one-half hour or longer, the protein compound obtained may be recovered by neutralizing the mass with acid, setting the same by cooling (if gelatin) and washing the protein material free from salts, etc., with cold water. If some other protein than gelatin is used the material is coagulated and washed in any appropriate manner. The material may then be dried and is ready for use.

The gelatin derivatives prepared in accordance with our invention are characterized among other things by their resistance to hardening by formaldehyde and by their greater resistance to hardening by chrome alum.

The following examples illustrate the preparation of the protein derivatives described herein.

Example 1

50 parts of casein is dispersed in 500 parts of water at a pH of 10.0, which pH was attained by the use of dilute alkali. This dispersion at a temperature of 60° C. was subjected to a treatment for two hours with 5 parts of phenyl 1-hydroxy-2-napthoate dissolved in 50 parts of acetone. The temperature and the pH of the reaction mass were held constant during this period of treatment. At the conclusion of the action the solution obtained was diluted with water and then acidified to a pH within the range 5–5.2. The solid material which separated from the mass is collected and placed in storage under cold conditions or may be dried.

Example 2

100 parts of gelatin was dispersed in 400 parts of water at a pH of 9.6. At a temperature of 40–45° C. there was then added to the gelatin dispersion thus obtained over a period of 20 minutes a solution of 21.1 parts of o-nitrophenyl acetate in 40 parts of acetone. The mixture was stirred mechanically and held at the initial temperature and pH during the addition period and for 30 minutes thereafter. The mixture was then adjusted to a pH of 6 with hydrochloric acid followed by chilling and noodling thereof and washing of the noodles with water for 24 hours. The product was then dried and further extracted with methanol. The product obtained yielded 85 parts of a gelatin derivative.

Example 3

A dispersion was prepared of 95 parts of gelatin in 900 parts of water at a temperature of 40–45° C. and a pH of 9.5. There was slowly added to this dispersion a solution of 21.5 parts of p-nitrophenyl acetate in 150 parts of actone. The pH and temperature of the mass were maintained at that found therein initially during the addition period and for 35 minutes thereafter. The mass was then adjusted to a pH of 5.0 with hydrochloric acid and was poured into four volumes of acetone. The coagulum obtained was extracted three times with fresh acetone following which it was redispersed in water, chilled, formed into noodles and washed and was then dried. A yield of 91 parts of gelatin derivative was obtained.

Example 4

93 parts of gelatin was dispersed in 1000 parts of water at 45–50° C. and at a pH of 9.5. This dispersion was treated by adding thereto over a period of 35 minutes 16.3 parts of isopropenyl acetate which addition was accompanied by stirring. The mass was then held for 30 minutes at the same temperature and pH following which the pH of the mass was adjusted to 6 by the addition of hydrochloric acid. The mass was chilled, and noodled and the noodles obtained were washed thoroughly in water and dried. 91 parts of gelatin derivative were obtained.

Example 5

95 parts of gelatin was dispersed in 1000 parts of water at a temperature of 45–50° C. and a pH of 9.6. There was then added thereto a solution of 6.1 parts of methyl o-chlorobenzoate in 20 parts of water. The mass was stirred for one hour while maintaining the desired temperature and pH conditions. The resulting mass was thoroughly mixed in 8 volumes of alcohol per volume thereof whereby coagulation was obtained. The coagulum thus resulting was extracted three times with acetone and then chilled, noodled and washed with water in the same manner as described herein. A gelatin derivative having an altered iso-electric point was obtained.

Example 6

93 parts of gelatin was dispersed in 900 parts of water at a pH of 9.5 and a temperature of 50° C. To this dispersion was added a solution of 11.35 parts of p-nitrophenyl benzoate in 50 parts of actone. The mass was stirred for one hour while maintaining the original conditions of pH and temperature. It was then coagulated by mixing with 6 volumes of acetone per volume of mass. The coagulum obtained was worked up in the manner described in the preceding examples to recover the gelatin derivative prepared.

Example 7

100 parts of gelatin in 900 parts of water at a temperature of 40–45° C. and a pH of 10 was mixed with a solution of 7.5 parts of phenyl salicylate in 50 parts of acetone. During this time the pH was held constant for one hour by the addition of dilute alkali thereto. The pH was then lowered to 6.0 with hydrochloric acid. The mass obtained was chilled, noodled, washed and dried in the same manner as prescribed above.

The gelatin derivatives of our invention are generally useful in capacities in which gelatin has previously been used but in addition many unusual properties are found therein. These gelatin derivatives are useful in lithographic printing processes, as a vehicle for silver halide in photographic emulsions or in imbibition processes in photography. For instance, if silver nitrate and alkali metal halide are reacted together in an aqueous solution of a gelatin derative as prepared in accordance with our invention the salver halide grains formed are uniformly dispersed so as to render the resulting material useful for the preparation of photographic products.

We claim:

1. A method of preparing a protein derivative which comprises reacting a protein selected from the group consisting of the albumens, the phospho proteins, the sclero proteins and the seed proteins with an ester selected from the group consisting of the ortho and para-nitrophenyl and the halo phenyl esters of the organic acids at a pH within the range of 8–12 and a temperature of 30–70° C.

2. A method of preparing a gelatin derivative which comprises reacting gelatin with an ester selected from the group consisting of the ortho and para-nitrophenyl and the halophenyl esters of the organic acids at a pH within the range of 8–12 and a temperature of 30–70° C.

3. A method of preparing a gelatin derivative which comprises reacting gelatin with para-nitrophenyl acetate at a pH within the range of 9–11 and a temperature of 40–45° C.

4. A method of preparing a gelatin derivative which comprises reacting gelatin with para-nitrophenyl benzoate at a pH within the range of 8–12 and at a temperature of 30–70° C.

5. A method of preparing a gelatin derivative which comprises reacting gelatin with o-nitro-phenyl acetate at a pH within the range 9–11 at a temperature of 40–45° C.

References Cited in the file of this patent

UNITED STATES PATENTS

| | | |
|---|---|---|
| 2,518,666 | Damschroder et al. | Aug. 15, 1950 |
| 2,548,520 | Damschroder et al. | Apr. 10, 1951 |
| 2,562,534 | Coffman | July 31, 1951 |
| 2,592,263 | Frame | Apr. 8, 1952 |

OTHER REFERENCES

Page: Chem. Abst., vol. 36, cols. 4729–31 (1942).

Pasynskii et al.: Chem. Abst., vol. 45, cols. 6409–10 (1947).